US012603222B1

(12) United States Patent
Schaedler et al.

(10) Patent No.: US 12,603,222 B1
(45) Date of Patent: Apr. 14, 2026

(54) CERAMIC BODY WITH EMBEDDED CAPACITOR

(71) Applicant: HRL Laboratories, LLC, Malibu, CA (US)

(72) Inventors: Tobias Schaedler, Oak Park, CA (US); Ekaterina Stonkevitch, Thousand Oaks, CA (US); Scott E. Macintosh, Simi Valley, CA (US); Gregory Jacques, Camarillo, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 136 days.

(21) Appl. No.: 18/458,137

(22) Filed: Aug. 29, 2023

(51) Int. Cl.
  *H01G 4/12* (2006.01)
  *H01G 4/012* (2006.01)
  *H01G 4/228* (2006.01)
  *H01G 4/30* (2006.01)

(52) U.S. Cl.
  CPC .............. *H01G 4/12* (2013.01); *H01G 4/012* (2013.01); *H01G 4/228* (2013.01); *H01G 4/30* (2013.01)

(58) Field of Classification Search
  CPC .......... H01G 4/12; H01G 4/012; H01G 4/228; H01G 4/30
  See application file for complete search history.

(56) References Cited

U.S. PATENT DOCUMENTS

| | | | |
|---|---|---|---|
| 6,395,658 B1 * | 5/2002 | Taira | H01G 4/1254 |
| | | | 428/433 |
| 9,679,699 B2 * | 6/2017 | Kamigaki | C08K 3/00 |
| 2007/0117338 A1 * | 5/2007 | Yamamoto | H05K 1/0231 |
| | | | 257/E23.079 |
| 2008/0158777 A1 * | 7/2008 | Sohn | H05K 1/162 |
| | | | 361/321.1 |
| 2009/0141427 A1 * | 6/2009 | Lyoo | B82Y 30/00 |
| | | | 501/138 |
| 2017/0263383 A1 * | 9/2017 | Kageyama | H01G 4/30 |
| 2018/0098428 A1 * | 4/2018 | Hua | H01L 21/486 |

OTHER PUBLICATIONS

U.S. Appl. No. 17/165,825, filed Feb. 2, 2021.
Yang, Y. et al., "Three dimensional printing of high dielectric capacitor using projection based stereolithography method", Nano Energy, Feb. 27, 2016, pp. 414-421, vol. 22, Elsevier Ltd.

* cited by examiner

*Primary Examiner* — Michael P Mcfadden
(74) *Attorney, Agent, or Firm* — Lewis Roca Rothgerber Christie LLP

(57) ABSTRACT

A ceramic body with an embedded capacitor. In some embodiments, a device includes: a ceramic body composed of a ceramic material; a first capacitor within the ceramic body; a first conductive trace; and a second conductive trace, the first capacitor including: one or more ceramic dielectric layers; two or more metallic electrodes; a first metallic terminal; and a second metallic terminal, the metallic electrodes alternating with the ceramic dielectric layers, the metallic electrodes begin connected alternately to: the first metallic terminal; and the second metallic terminal, the first metallic terminal being connected to the first conductive trace, the second metallic terminal being connected to the second conductive trace, the first capacitor having a volume of at most 10% of a volume of the ceramic body.

20 Claims, 14 Drawing Sheets

Top View

Metallic electrodes

Layers of dielectric ceramic

Side View

Metallic terminal

Metallic electrodes

Metallic terminal

Layers of dielectric ceramic

Top View

Metallic electrodes

Layers of dielectric ceramic

Side View

Conductive metal

Layers of dielectric ceramic used for package

Layers of dielectric ceramic used for capacitor

Top View

Metallic electrodes

Layers of dielectric ceramic

Side View

Conductive metal

Layers of dielectric ceramic used for capacitor

Layers of dielectric ceramic used for package

Side View

Thicker layers of dielectric ceramic

Thinner layers of dielectric ceramic

Thicker layers of dielectric ceramic

Metallic terminals

Metallic electrodes

Top View

Conductive metal

Layers of dielectric ceramic

Top View

Conductive metal

Layers of dielectric ceramic

Side View

Side View

Metallic
terminals

Metallic electrodes

Layers of dielectric ceramic

Side View

Side View

Metallic terminals

Metallic electrodes

Layers of dielectric ceramic

CERAMIC DEPOSITION
A layer of ceramic slurry or paste is spread
905

UV CURING
Selective area curing of the ceramic slurry
910

UNCURED MATERIAL REMOVAL
Uncured material is removed where different material will be deposited.
915

METAL DISPENSING
Metal ink is dispensed locally
920

UV CURING
Metal ink is UV cured
925

1000.00µm

Metal (Ag)

Ceramic
(SiOC + mullite)

5μm

CERAMIC BODY WITH EMBEDDED CAPACITOR

CROSS-REFERENCE TO RELATED APPLICATION(S)

The present application is related to U.S. patent application Ser. No. 17/165,825, filed Feb. 2, 2021, entitled "3D PRINTED CERAMIC STRUCTURE WITH METAL TRACES", U.S. Pat. No. 11,756,799, the entire content of which is incorporated herein by reference.

FIELD

One or more aspects of embodiments according to the present disclosure relate to ceramic parts, and more particularly to a ceramic body with an embedded capacitor.

BACKGROUND

Ceramic packages may be used in various applications, for example as chip carriers or packages for semiconductor chips. Accommodating capacitors (e.g., power supply decoupling capacitors) in such a package may be challenging.

It is with respect to this general technical environment that aspects of the present disclosure are related.

SUMMARY

In accordance with an embodiment of the present disclosure, there is provided a device, including: a ceramic body composed of a ceramic material; a first capacitor within the ceramic body; a first conductive trace; and a second conductive trace, the first capacitor including: one or more ceramic dielectric layers; two or more metallic electrodes; a first metallic terminal; and a second metallic terminal, the metallic electrodes alternating with the ceramic dielectric layers, each of the ceramic dielectric layers having a thickness between 1 and 75 microns, each of the metallic electrodes having a thickness between 0.1 and 50 microns, the metallic electrodes begin connected alternately to: the first metallic terminal; and the second metallic terminal, the first metallic terminal being connected to the first conductive trace, the second metallic terminal being connected to the second conductive trace, the first capacitor having a volume of at most 10% of a volume of the ceramic body.

In some embodiments, the dielectric ceramic layers have the same thickness as the metallic electrodes.

In some embodiments, the ceramic body is composed of layers having a thickness between 1 micron and 75 microns.

In some embodiments, the ceramic body and the dielectric ceramic layers have the same composition.

In some embodiments, the ceramic body and the dielectric ceramic layers are both composed of between 40 vol % and 75 vol % ceramic particles in a matrix.

In some embodiments, the matrix includes silicon oxycarbide as a major component, the silicon oxycarbide including: between 20 at % and 40 at % Si, between 30 at % and 80 at % C, and between 10 at % and 50 at % O.

In some embodiments, a ceramic particle in the ceramic body includes, as a major component, a substance selected from the group consisting of $Al_2O_3$, $SiO_2$, mullite, zirconia, silicate glass, borosilicate glass, aluminosilicate glass, hexagonal boron nitride, cordierite ($Mg_2Al_4Si_5O_{18}$), aluminum phosphate, magnesium aluminate spinel ($MgAl_2O_4$), barium strontium aluminum silicate ($(Ba,Sr)Al_2Si_2O_8$).

In some embodiments, a ceramic particle in a dielectric ceramic layer includes, as a major component, an oxide or a mixture of oxides with a dielectric constant deviating by no more than 30% from a linear temperature dependence over a range of temperatures between 70 Kelvin (K) and 300 K.

In some embodiments, a ceramic particle in a dielectric ceramic layer includes, as a major component, a substance selected from the group consisting of niobates, tantalates, zirconates and titanates, and mixtures thereof.

In some embodiments, a ceramic particle in a dielectric ceramic layer includes, as a major component, a substance selected from the group consisting of $MgNb_2O_6$, $ZnNb_2O_6$, $MgTa_2O_6$, $ZnTa_2O_6$, $(ZnMg)TiO_3$, $(ZrSn)TiO_4$, $Ba_2Ti_9O_{20}$, $BaZrO_3$, or mixtures thereof.

In some embodiments, a ceramic particle in a dielectric ceramic layer includes, as a major component, an oxide having a dielectric constant greater than 1000 at room temperature.

In some embodiments, a ceramic particle in a dielectric ceramic layer includes, as a major component, a substance selected from the group consisting of $BaTiO_3$, $SrTiO_3$, and mixtures thereof.

In some embodiments, the device further includes a second capacitor within the ceramic body.

In some embodiments, the device further includes a semiconductor chip on the ceramic body.

In some embodiments, the first metallic terminal includes: a first via extending through a first ceramic dielectric layer of the ceramic dielectric layers and through a second ceramic dielectric layer of the ceramic dielectric layers; and a second via extending through a third ceramic dielectric layer of the ceramic dielectric layers and through a fourth ceramic dielectric layer of the ceramic dielectric layers.

In some embodiments, the second via is offset from the first via.

In accordance with an embodiment of the present disclosure, there is provided an article, including: a layered body; a first metallic conductive trace, on the layered body; and a second metallic conductive trace, on the layered body, the layered body including: a plurality of first layers; a plurality of second layers; and a plurality of third layers, wherein: each of the first layers has a thickness of between 1 micron and 75 microns, and includes a first polymer and between 20 vol % and 50 vol % particles of a first ceramic; each of the second layers has a thickness of between 1 micron and 75 microns, and includes a second polymer and between 20 vol % and 50 vol % particles of a second ceramic; each of the third layers has a thickness of between 0.1 microns and 50 microns and includes a first region and a second region; each of the third layers includes, within the first region of the third layer, a third polymer or a solvent and between 40 vol % and 100 vol % metallic particles having a thickness between 0.1 and 50 microns; alternating first regions are connected to a first metallic terminal and a second metallic terminal; the first metallic terminal extends through one or more of the second layers; and the second metallic terminal extends through one or more of the second layers.

In some embodiments, the first polymer is selected from the group consisting of polyacrylates, siloxanes, silazanes, carbosilanes, silsesquioxanes, and mixtures thereof.

In some embodiments, the second polymer is selected from the group consisting of polyacrylates, siloxanes, silazanes, carbosilanes, silsesquioxanes, and mixtures thereof.

In accordance with an embodiment of the present disclosure, there is provided a method, including: printing a green preceramic part; and firing the green preceramic part, to form a ceramic part, the ceramic part including: a ceramic body; and a first ceramic capacitor embedded in the ceramic body, the first ceramic capacitor having a volume of at most 10% of a volume of the ceramic body.

BRIEF DESCRIPTION OF THE DRAWINGS

These and other features and advantages of the present disclosure will be appreciated and understood with reference to the specification, claims, and appended drawings wherein:

4

Figure 10A:
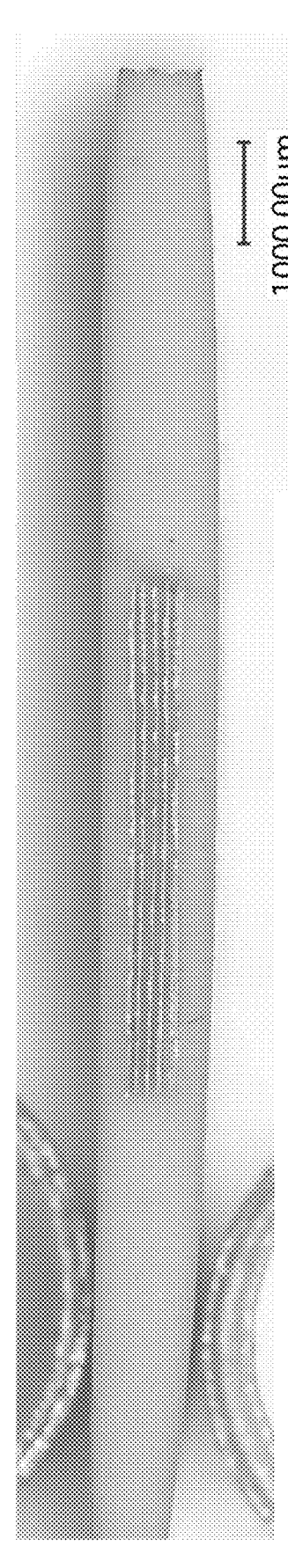
FIG. 10A is a photograph of a reduction to practice, according to an embodiment of the present disclosure.
Figure 10B:
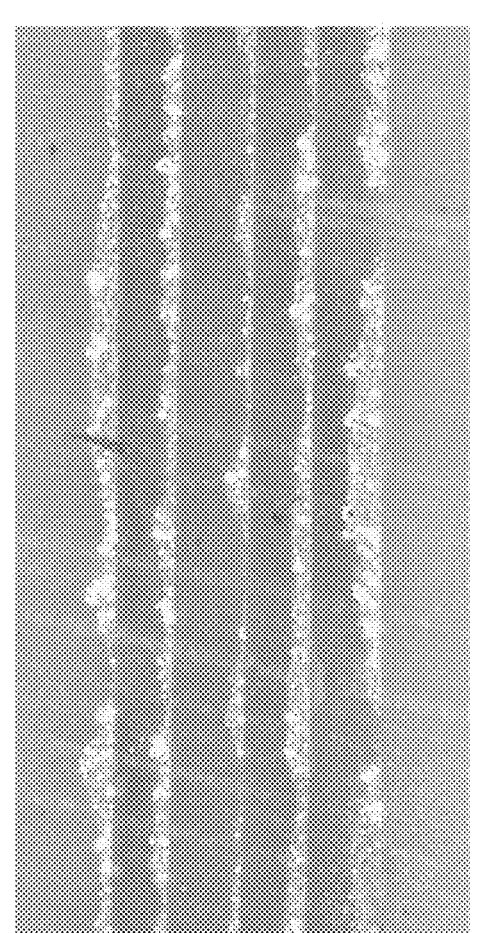
FIG. 10B is a photograph of a reduction to practice, according to an embodiment of the present disclosure.
Figure 10C:
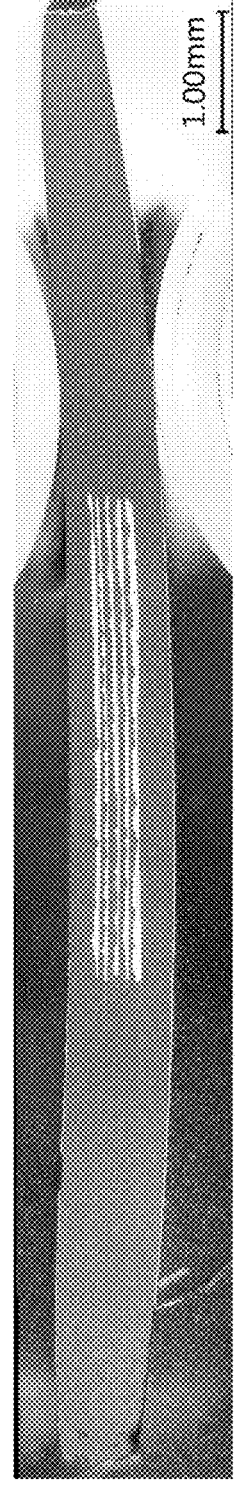
Figure 10E:
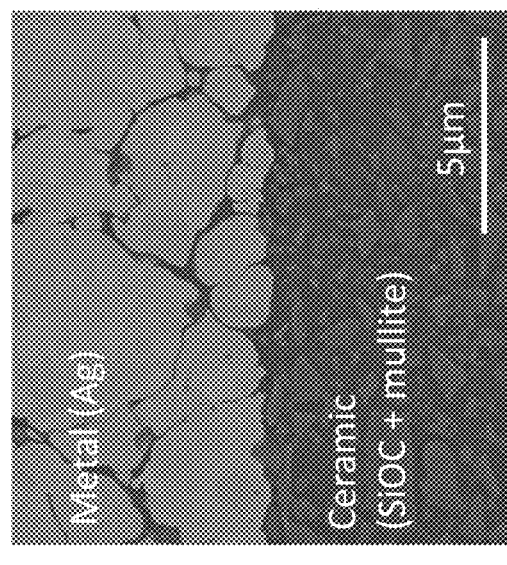
Figure 10E:
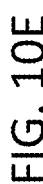
Figure 10D:
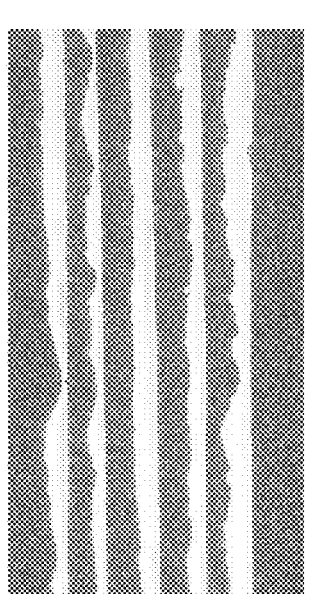

FIG. 10C is a photograph of a reduction to practice, according to an embodiment of the present disclosure;

FIG. 10D is a photograph of a reduction to practice, according to an embodiment of the present disclosure; and FIG. 10E is a photograph of a reduction to practice, according to an embodiment of the present disclosure.

DETAILED DESCRIPTION

The detailed description set forth below in connection with the appended drawings is intended as a description of exemplary embodiments of a ceramic body with an embedded capacitor provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
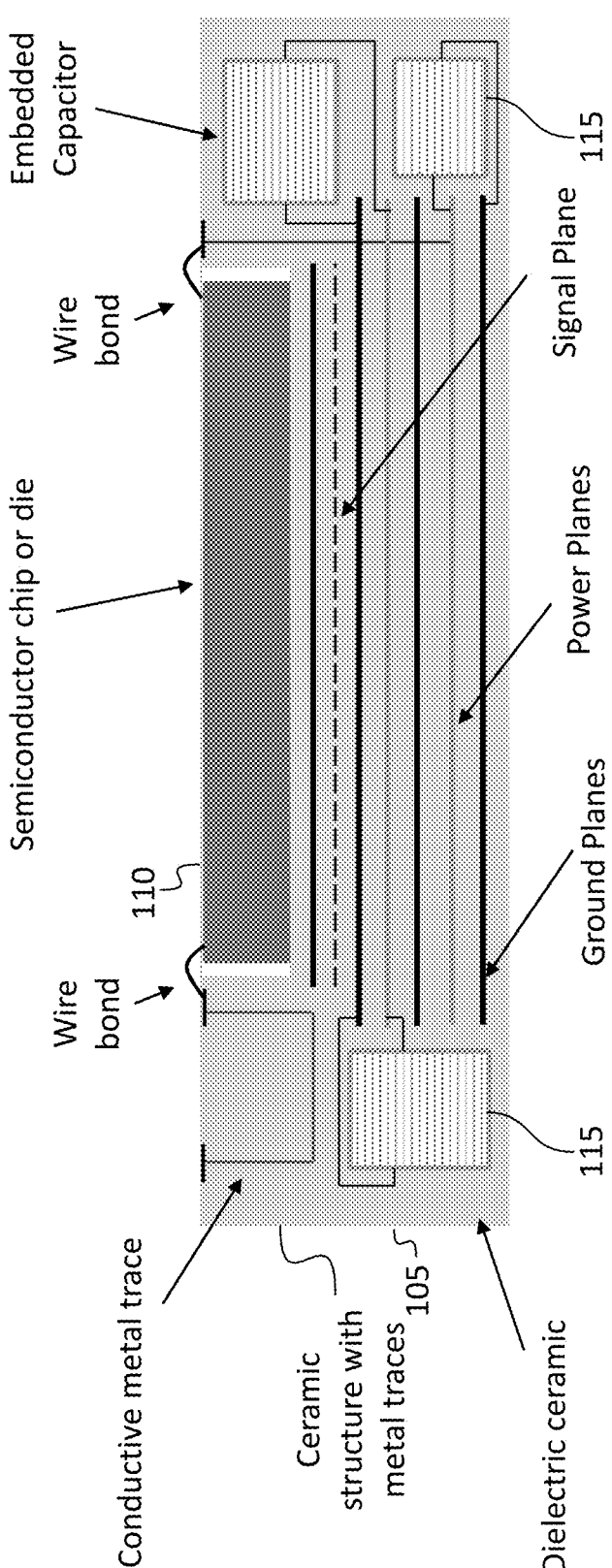
FIG. 1A is a schematic side cross-sectional view of a device, according to an embodiment of the present disclosure.
Figure 1B:
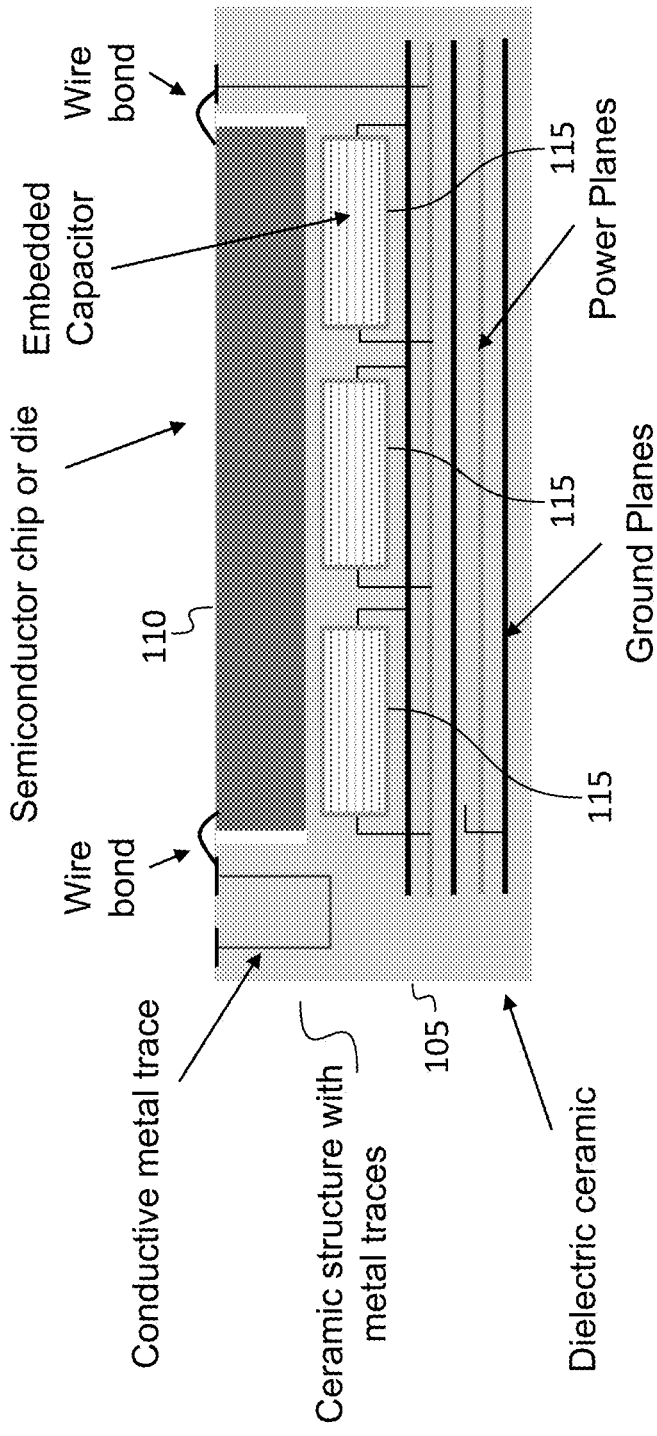
FIG. 1B is a schematic side cross-sectional view of a device, according to an embodiment of the present disclosure.
Figure 1C:
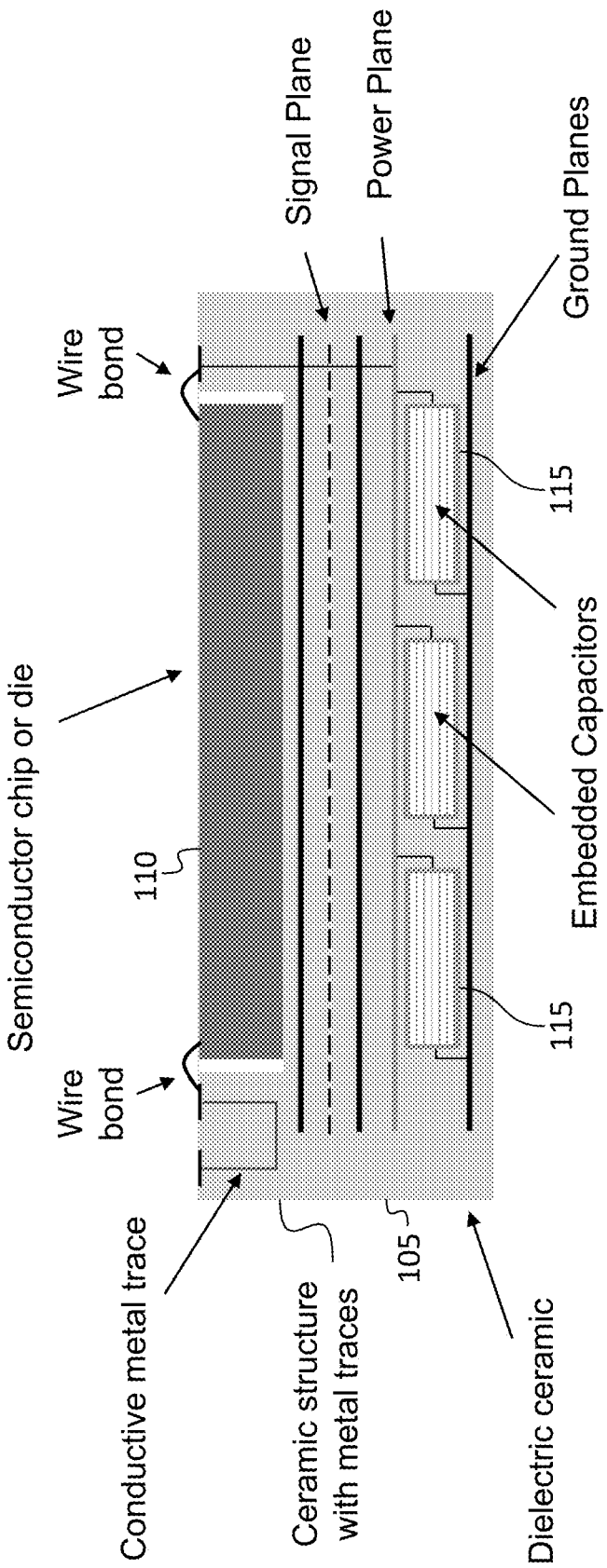
FIG. 1C is a schematic side cross-sectional view of a device, according to an embodiment of the present disclosure.

FIG. 1A shows a device, in some embodiments. The device may be or include a ceramic body 105, which may be a microelectronic package, such as a chip carrier or a package for infrared focal plane arrays (IR FPA). The device may also include a semiconductor chip or die 110, such as an infrared focal plane array or an application specific integrated circuit (ASIC). The device may include one or more capacitors 115, which may be within the ceramic body 105 (e.g., within the volume of the ceramic body 105, e.g., embedded in the ceramic body 105) as shown. Each capacitor may be connected with conductive metal traces to ground and power planes in the package. FIGS. 1B and 1C show different capacitor placements in respective different embodiments. The size of the ceramic body 105 may be 10 cm×10 cm×4 mm for example. The devices of FIGS. 1A, 1B, and 1C may be fabricated by using three-dimensional printing (3D printing), or additive manufacturing, to print a part composed of preceramic polymer (which may be referred to as a "green" preceramic part), firing the green part to form a ceramic part, and installing a semiconductor chip or die 110 on the ceramic body 105 (e.g., on a top surface of the ceramic body 105 or, as illustrated, in a recess in the top surface of the ceramic body 105).

Figures 2A, 2B:
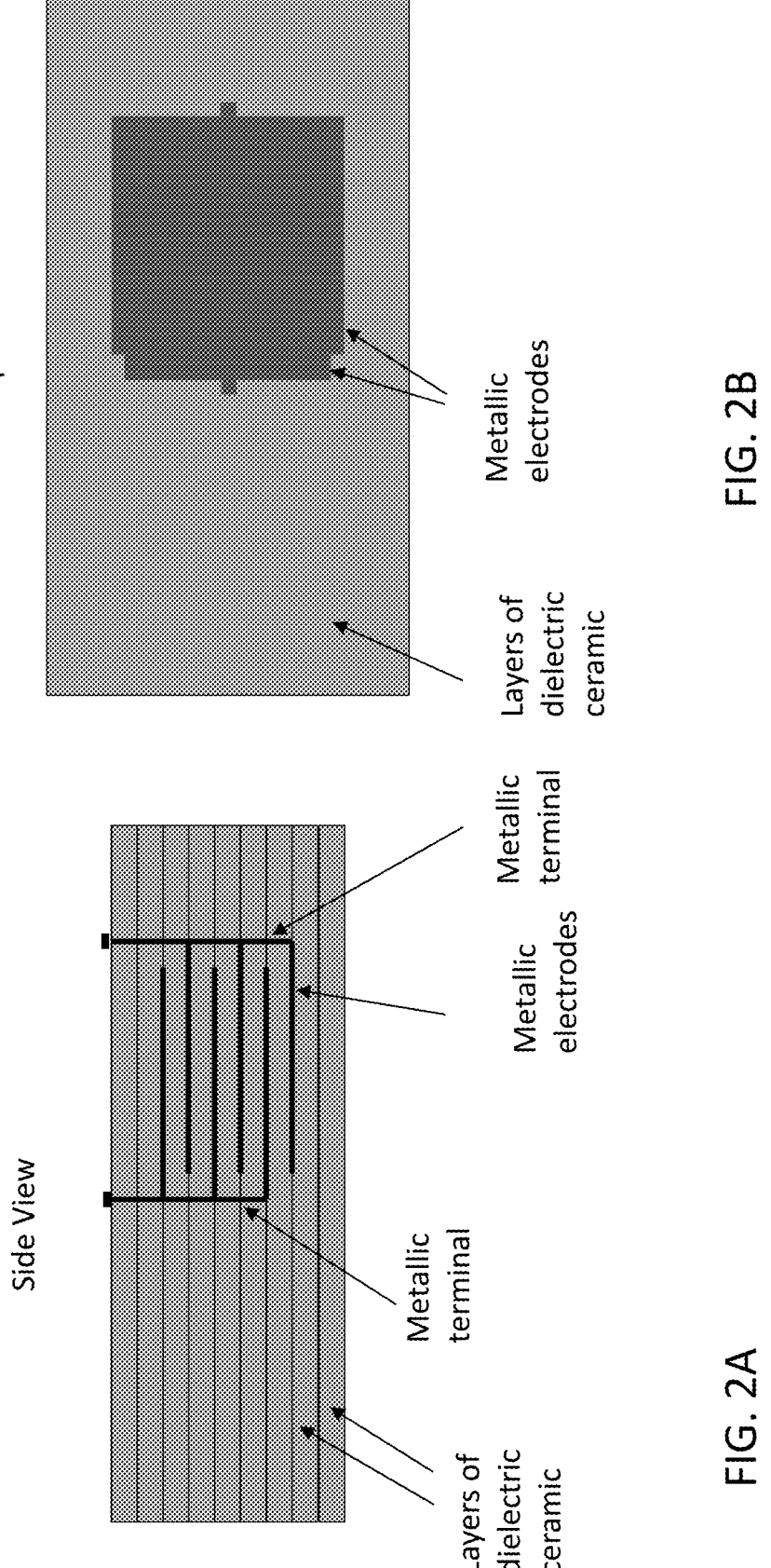
FIG. 2A is a side cross-sectional view of a portion of a device, according to an embodiment of the present disclosure.
FIG. 2B is a top cross-sectional view of a portion of a device, according to an embodiment of the present disclosure.
Figure 3B:
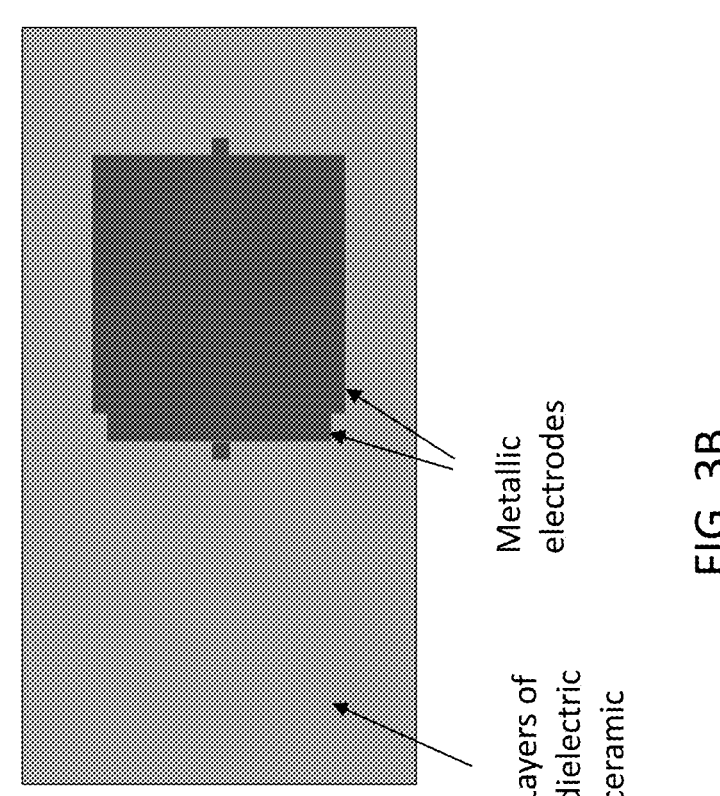
FIG. 3B is a top cross-sectional view of a portion of a device, according to an embodiment of the present disclosure.
Figure 3A:
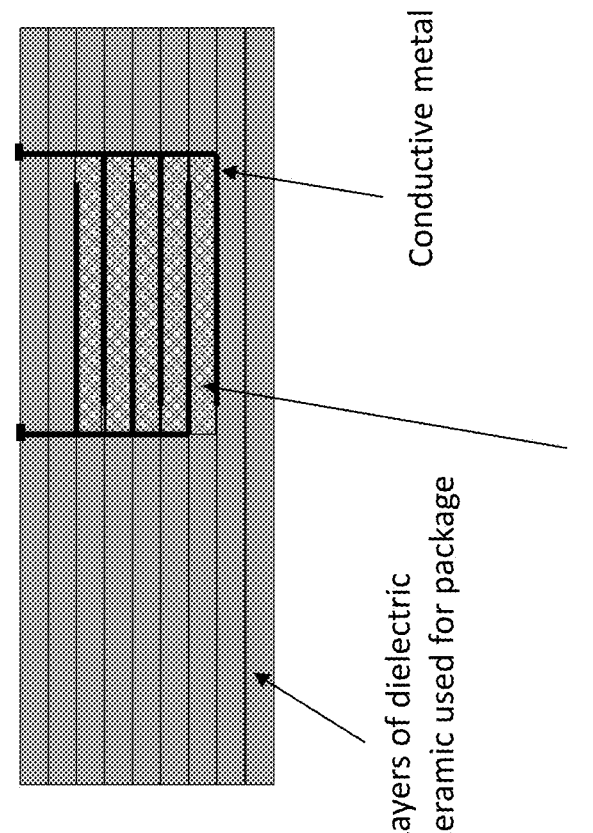
FIG. 3A is a side cross-sectional view of a portion of a device, according to an embodiment of the present disclosure.

FIGS. 2A and 2B show (a side view and a top view, respectively, of) one embodiment of an embedded capacitor in which the dielectric ceramic in the capacitor is the same ceramic that is used for the package. This has the advantage that only two different materials, one dielectric ceramic and one conductive metal, are required to fabricate the package with the embedded capacitor. FIGS. 3A and 3B show (a side view and a top view, respectively, of) an embodiment in which a third material is used, e.g., the dielectric ceramic used for the capacitor is different from the dielectric ceramic used for the package. This has the advantage that a dielectric material with properties optimized for the capacitor, such as a higher dielectric constant or a dielectric constant that is independent of temperature, may be used for the capacitor, whereas a different ceramic, with properties more suitable for the package, for example lower cost, better hermeticity, or greater ease of fabrication by 3D printing, is used for the remainder of the package.

In both the embodiment of FIGS. 2A and 2B and the embodiment of FIGS. 3A and 3B, the print layer thickness of the ceramic may be between 5 and 50 microns (micrometers). These embodiments they may be fabricated by printing the corresponding green parts using three-dimensional (3D) printing methods including Stereolithography (SLA), Digital Light Processing (DLP), Continuous Laser Assisted Deposition (CLAD), Laser Induced Forward Transfer (LIFT), inkjet printing, aerosol jet printing, direct ink writing (DIW) and microextrusion. The conductive metal may be applied between the ceramic layers at a thickness of between 1 and 10 microns (um), using metal Stereolithography (SLA), Digital Light Processing (DLP), Continuous Laser Assisted Deposition (CLAD), Laser Induced Forward Transfer (LIFT), inkjet printing, aerosol jet printing, direct ink writing (DIW) and microextrusion. For example, if stereolithography is used, a layer of preceramic polymer may be formed by selectively exposing a thin layer of a suitable resin, on the top surface of the partially fabricated part, to ultraviolet (UV) light (thereby curing a portion or region of the layer of resin to form the preceramic polymer), and removing the remaining uncured resin, leaving one or more gaps or voids in the layer of preceramic polymer. A suitable conductive resin may then be deposited in the gaps or voids (e.g., by flooding the top surface with the conductive resin, and leveling it with a coater blade or similar tool) and cured, e.g., by illuminating the entire upper surface of the partially formed part with UV light. In some embodiments, an analogous process is employed, in which a metal layer having gaps or voids is formed first, e.g., by SLA, and the preceramic polymer is then formed to fill the gaps or voids (e.g., by filling the gaps or voids with suitable resin and curing the resin).

Figure 4B:
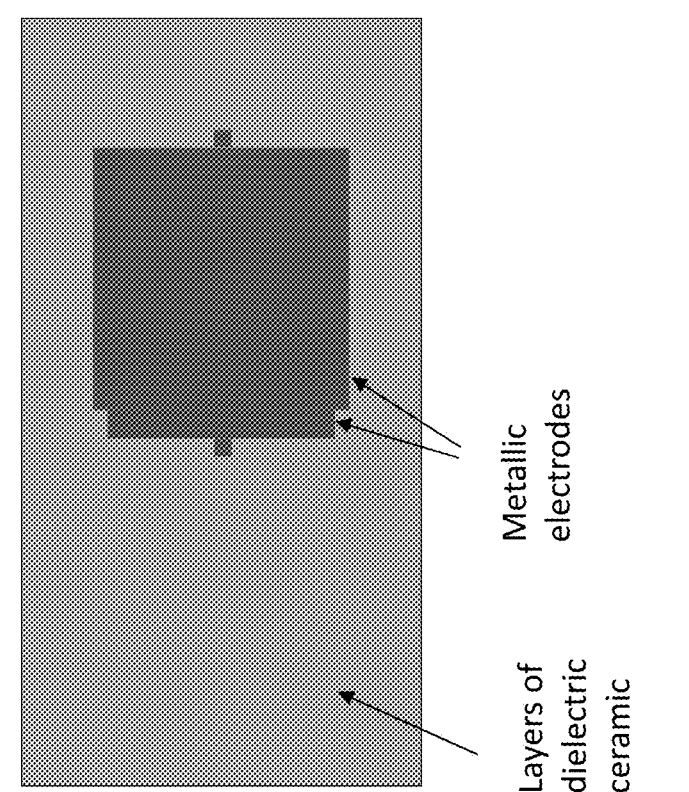
FIG. 4B is a top cross-sectional view of a portion of a device, according to an embodiment of the present disclosure.
Figure 4A:
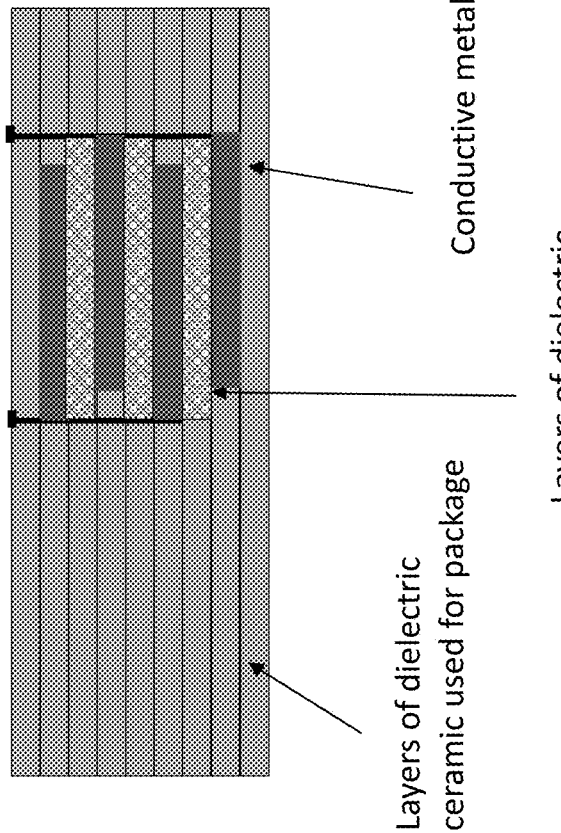
FIG. 4A is a side cross-sectional view of a portion of a device, according to an embodiment of the present disclosure.
Figure 5:
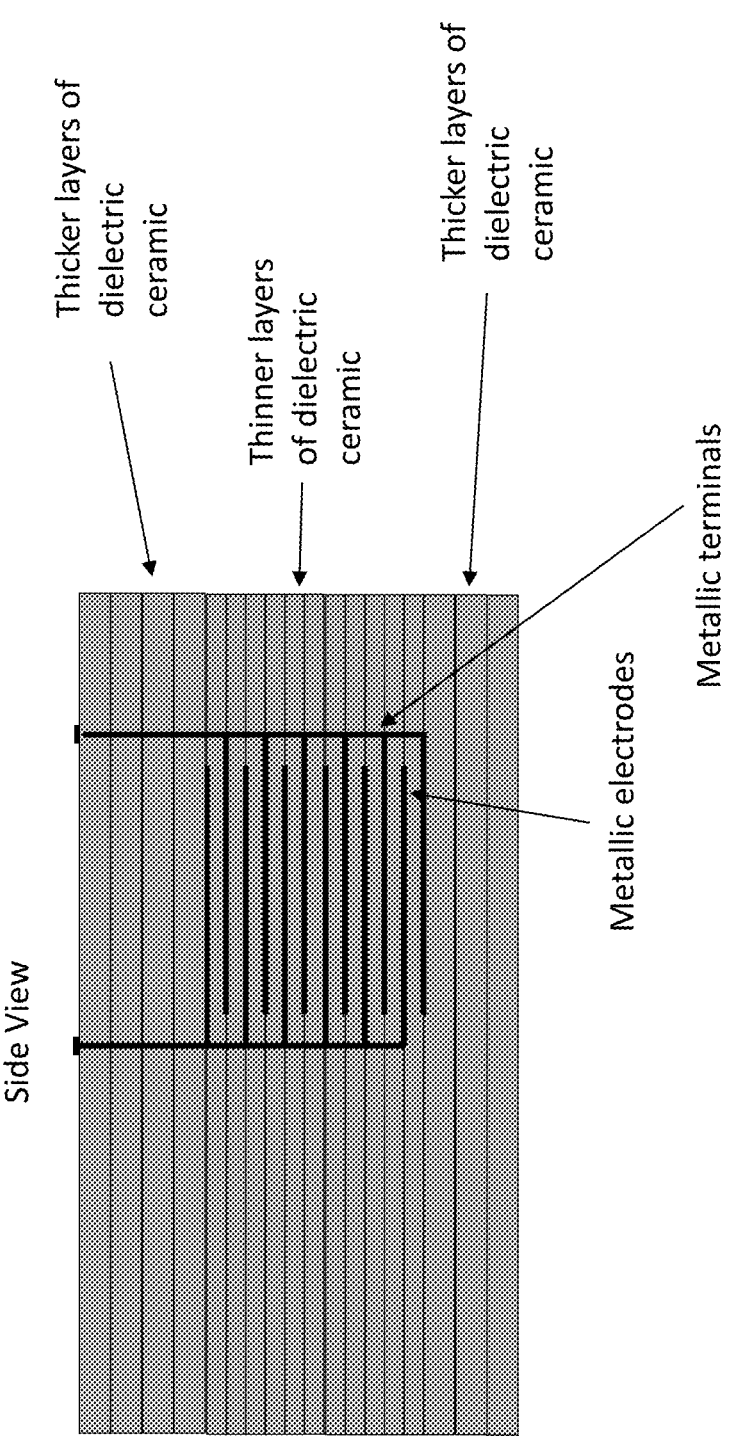
FIG. 5 is a side cross-sectional view of a portion of a device, according to an embodiment of the present disclosure.
Figure 6B:
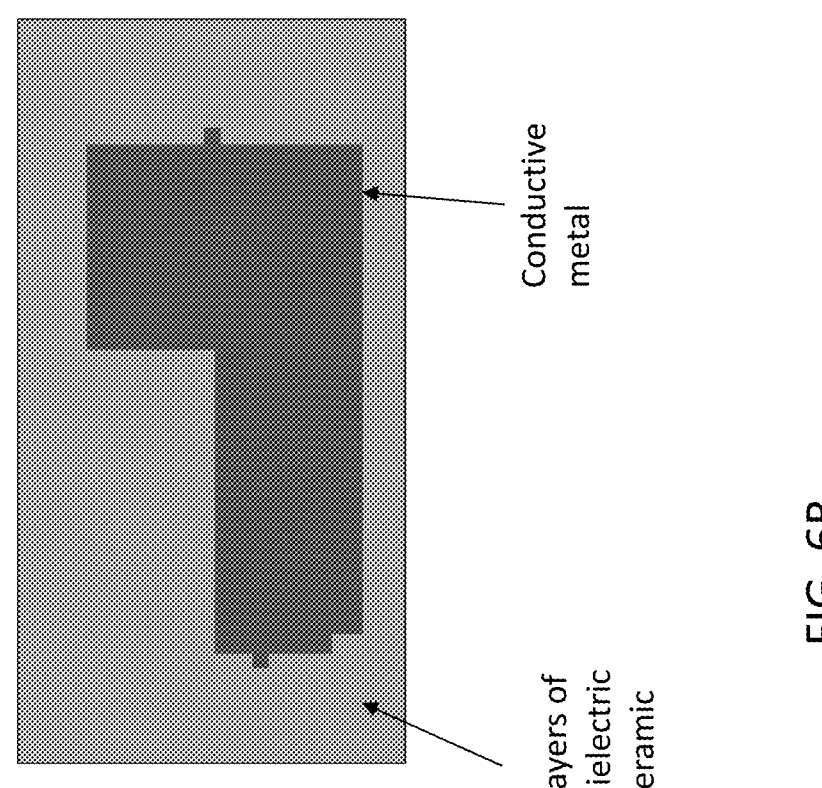
FIG. 6B is a top cross-sectional view of a portion of a device, according to an embodiment of the present disclosure.
Figure 6A:
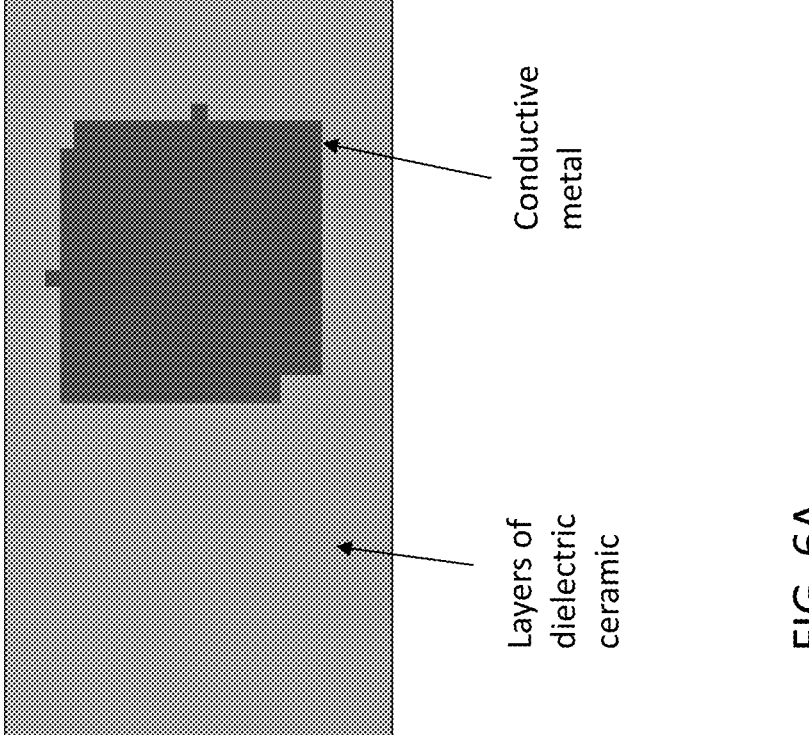
FIG. 6A is a top cross-sectional view of a portion of a device, according to an embodiment of the present disclosure.

In some embodiments, the same layer thickness is used for metal and ceramic materials as shown in FIG. 4. To achieve both a thin layered capacitor and high-rate printing of the rest of the package, the print layer thickness may be varied during the printing process resulting in layers of different thicknesses inside the package, as shown in FIG. 5. With this approach, ceramic layers as thin as 1 micron (um) and metal layers as thin as 0.5 um may be printed to increase the capacitance per unit volume. The shape of the capacitor may be varied widely. FIGS. 6A and 6B show examples of the electrode shape, which is not limited to a square or rectangular shape. The number of layers may be varied as well. Multiple capacitors may be embedded in the ceramic carrier with different shapes at different locations.

Figures 7A, 7B:
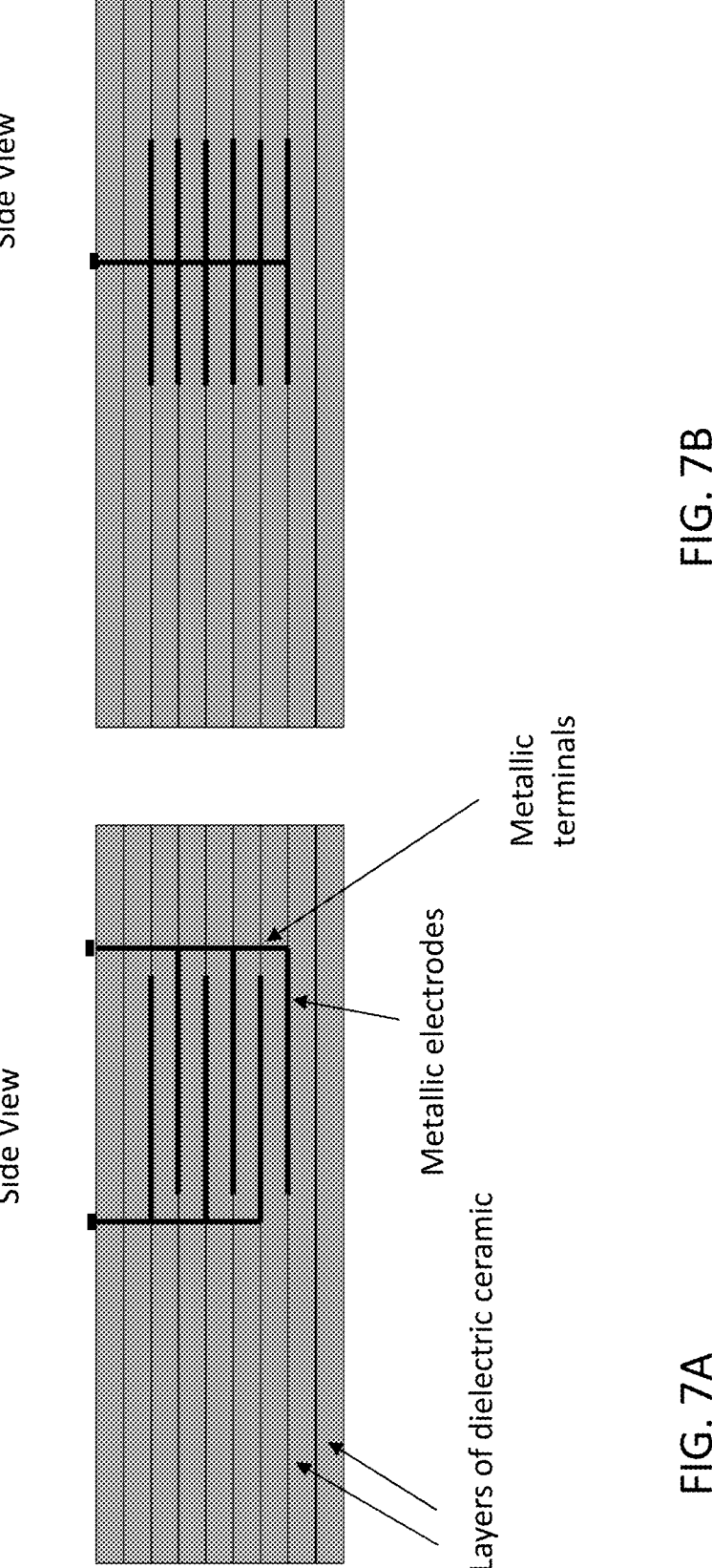
FIG. 7A is a side cross-sectional view of a portion of a device, according to an embodiment of the present disclosure.
FIG. 7B is a side cross-sectional view of a portion of a device, according to an embodiment of the present disclosure.
Figures 7C, 7D:
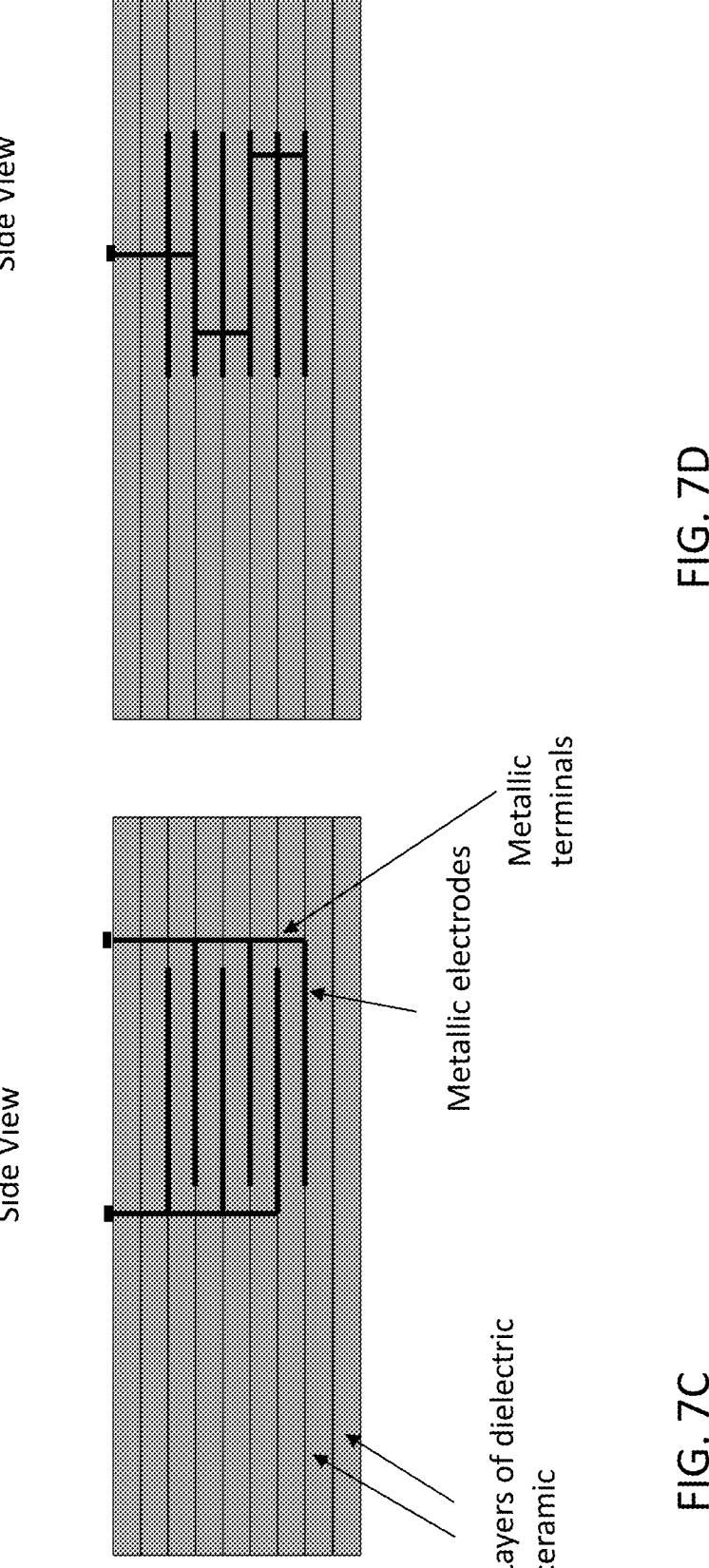
FIG. 7C is a side cross-sectional view of a portion of a device, according to an embodiment of the present disclosure.
FIG. 7D is a side cross-sectional view of a portion of a device, according to an embodiment of the present disclosure.

The metallic terminals for the embedded capacitor may be designed to be round or rectangular (e.g., square) vias connecting the electrodes. The terminals connect every other electrode, which may be achieved by staggering every other electrode and connecting the ends as seen in FIGS. 7A and 7B. To mitigate stresses in the material during curing and co-firing (e.g., stresses caused by differential shrinkage of metal and ceramic), the vias in different layers may be offset from each other so that the vias may be spread out to different locations at the end of the electrodes as seen in FIGS. 7C and 7D. The vias may be sized to be large enough to transport the current on discharging and, accordingly, may be between 50 microns (um) and 500 um in diameter.

In some embodiments, between 15% percent by volume (vol %) and 40 vol % of ceramic particles (having a size between 0.3 um and 7 um) in siloxane based UV active resin may form a slurry or paste that may be used to print the ceramic. A dispersant (e.g., a dispersant including surface active molecules) may be employed to keep the particles in suspension. If two different ceramics are used, a similar vol % ceramic particle loading may be used for both ceramics, to ensure similar shrinkage on firing. The same siloxane resin may be used, although the concentrations of UV initiator, UV absorber and inhibitor may be different; for example, in each resin mixture the concentrations of UV initiator, UV absorber and inhibitor may be optimized for the particles.

Firing or pyrolysis of these siloxane-based resins may be done in an inert atmosphere (e.g., in an argon atmosphere) at a slow heating rate of between 0.5 degrees Celsius per minute (° C./min) and 3° C./min to a maximum temperature of 800° C. to 1000° C. with a dwell of between 10 minutes and 1 hour.

When performing co-printing and co-firing with different materials, the materials may be selected to be compatible. This compatibility may include chemical compatibility, so that no reaction occurs at the interface between the different materials during printing, firing and operation. During printing the use of solvents or monomers in one resin or ink that interact negatively with another resin or ink may be avoided. During co-firing solid-state reactions may occur and the materials used in the device may be selected to avoid the formation of unwanted phases.

Another embodiment uses feedstock resin for the ceramic materials that is based on other preceramic resins including carbosilanes, silazanes, or mixtures thereof, which may be used instead of siloxanes or in mixtures including siloxanes.

Another embodiment uses feedstock resin for the ceramic materials that is based on organic acrylate resins instead of siloxane. In that case the firing may be conducted in air to first remove the organic resin (debinding) and to then sinter the ceramic particles. This approach may cause larger shrinkage and may require higher temperatures to sinter.

Several conductive metal inks (which may be commercially available) may be employed, including inks containing silver, gold, copper, molybdenum, tungsten, and mixtures thereof. Such inks may be based on particle suspensions in solvents, and UV curing may not be possible or necessary. Instead, the solvent is removed by letting the ink dry at ambient temperatures or with the help of a heat treatment (e.g., at between 80° C. and 120° C.), with a heat lamp, or with an infrared laser. These inks may also be used for multi-material printing with a suitable printing approach.

Class 1 capacitors have a dielectric constant that may be fairly linear with temperature (e.g., that may deviate by no more than 30% from a linear temperature dependence over a range of temperatures between 70 Kelvin (K) and 300 K) and that may therefore be suitable for cryogenic applications like infrared (IR) focal plane arrays (FPAs). Dielectric materials used in such capacitors may include $MgNb_2O_6$, $ZnNb_2O_6$, $MgTa_2O_6$, $ZnTa_2O_6$, $(ZnMg)TiO_3$, $(ZrSn)TiO_4$, $Ba_2Ti_9O_{20}$, and $BaZrO_3$. Class 1 capacitors may have lower volumetric efficiency (e.g., specific capacitance), but the carrier may be able to accommodate them if they are embedded in the carrier (as opposed to being installed on the carrier, adjacent to a semiconductor chip, for example).

Class 2 ceramic capacitors have a dielectric with a high permittivity and therefore a better volumetric efficiency than class 1 capacitors, but lower accuracy and stability. The ceramic dielectric in such a capacitor may exhibit a nonlinear change of capacitance over the temperature range. The capacitance value may also depend on the applied voltage. Class 2 capacitors may be made of ferroelectric materials such as barium titanate ($BaTiO_3$) and suitable additives such as aluminium silicate, magnesium silicate and aluminium oxide.

The capacitance C of a multi-layer ceramic plate capacitor may be calculated with the following formula:

$$C = \varepsilon_r \cdot \varepsilon_0 \cdot n \cdot A/d,$$

Where Er is the relative dielectric permittivity, co is the vacuum permittivity ($8.854 \times 10^{-12}$ F/m), n is the number of layers, A is the electrode surface area, and d the distance between electrodes.

Assuming a relative permittivity of 37, typical for Class 1 ceramic capacitor material (ZrSn)TiO4 and similar to other Class 1 materials, an area A of 1 cm², a distance between electrodes of 10 um, and 100 layers, a capacitance of 327 nF is calculated. The capacitance of this embedded capacitor is in the range of capacitors that may otherwise be used for packaging applications.

Figure 8:
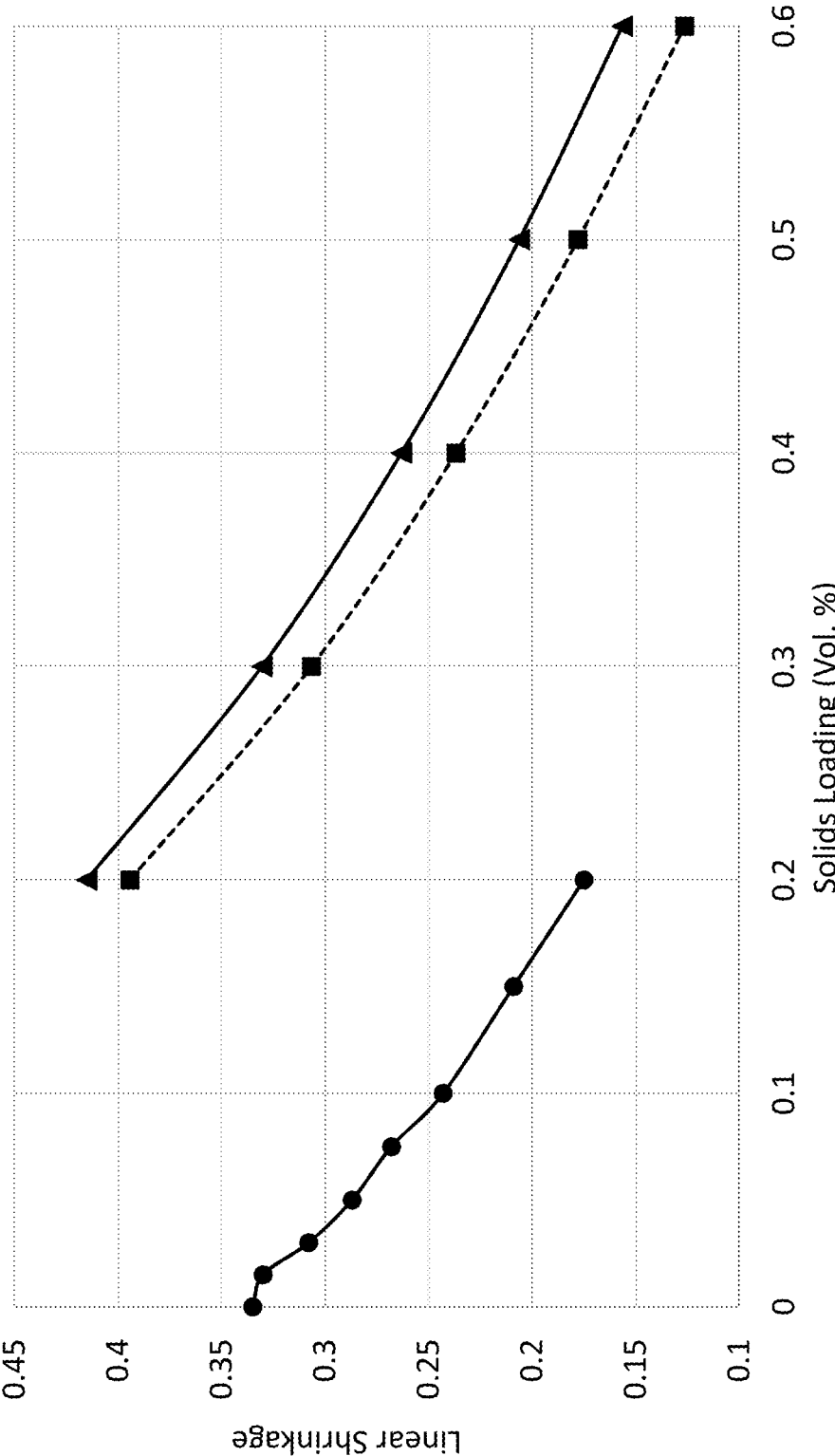
FIG. 8 is a graph of linear shrinkage versus solids loading of the UV curable preceramic resin used for 3D printing, according to an embodiment of the present disclosure.

In some embodiments, the materials are selected such that the shrinkage on firing is similar, to avoid the formation of voids or cracks and to avoid dimensional distortion. FIG. 8 shows the measured shrinkage of a pre-ceramic siloxane resin filled with different volume fractions of ceramic particles (solid line, round markers). This figure also shows the calculated shrinkage of an organic acrylate resin filled with metal or ceramic particles, when this resin is "burned off" completely during firing. Linear shrinkage ($Y_s$), is calculated as a function of the initial solids loading ($\phi$) of powder in the resin, the theoretical density of the powder ($\rho_t$), and the final sintered density ($\rho$), as described in the following equation:

$$Y_s = 1 - \left(\frac{\phi}{\rho/\rho_t}\right)^{1/3}$$

The solid line with triangle markers shows the calculated shrinkage assuming 0% porosity and the dashed line with square markers shows the shrinkage assuming 10% porosity in the material after firing.

To ensure dimensional stability and avoid cracking during firing, the shrinkage of the different materials may be selected to be similar. For example, resins may be co-printed that have a shrinkage of 20% during co-firing: pre-ceramic siloxane resin with 16 vol % ceramic particles for the body of the package, organic acrylate resin with 50 vol % silver particles for the conducting traces, capacitor electrodes and terminals, and organic acrylate resin with 50 vol % of dielectric particles with the desired properties for the capacitor dielectric. In this manner the differential shrinkage may be limited, e.g., to 10% of the average shrinkage. For example, if one of two materials in the device shrinks by 30%, the other material may shrink by between 27% and 33%. This may avoid stresses and crack formation on firing.

Figure 9:
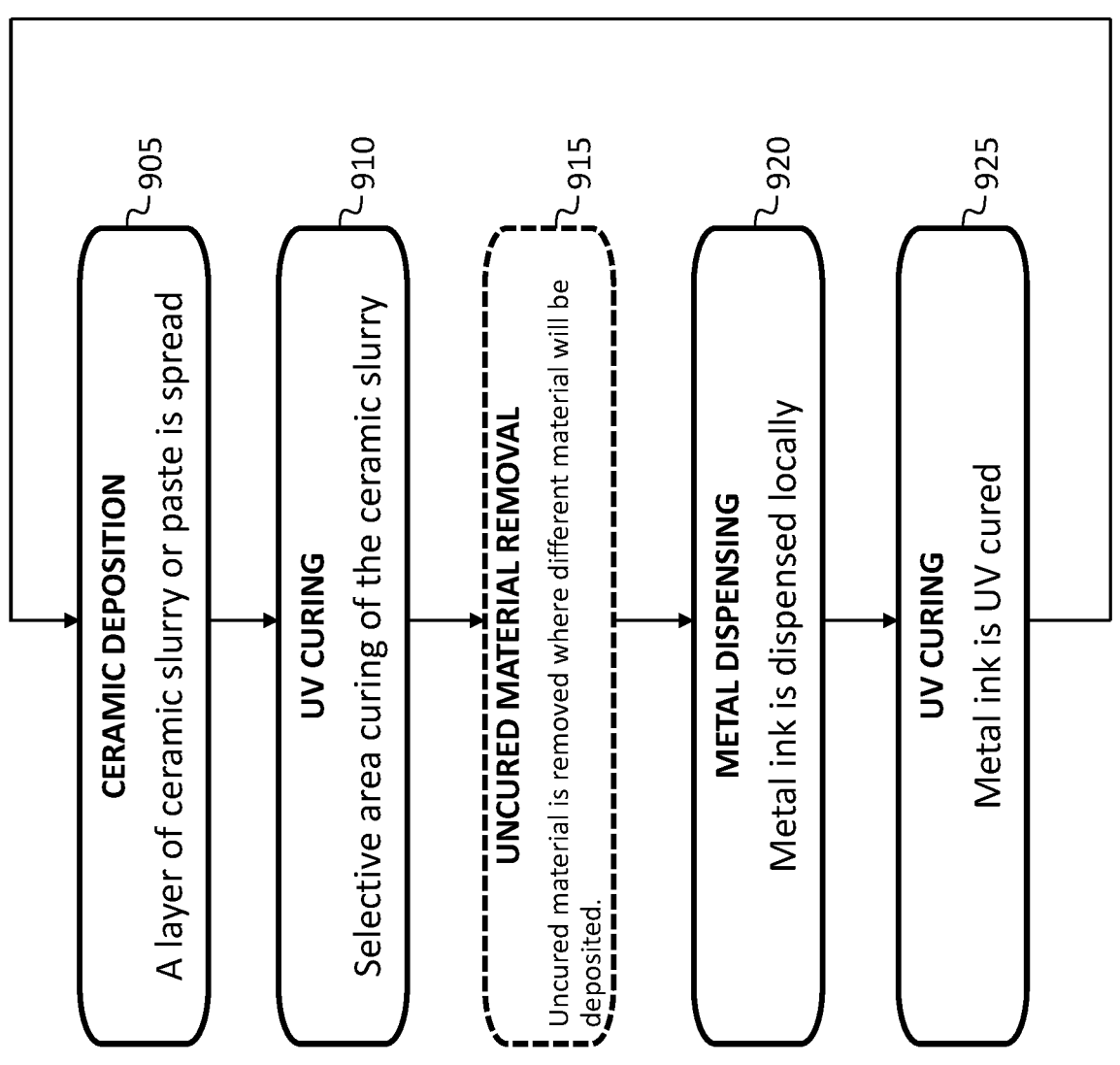
FIG. 9 is a flow chart of a multi-material printing process flow portion of a fabrication process, according to an embodiment of the present disclosure.

Several different multi-material printing methods may be used to print packages with embedded capacitors. FIG. 9 shows a method, according to some embodiments, that is based on SLA or DLP of ceramic slurries for the body of the package, combined with aerosol jet deposition of UV curable silver-containing resin for the conductive metal features. Organic or preceramic resins laden with ceramic particles may be used to form a slurry or paste that is spread, at 905, as a thin layer. Selected areas of this layer are then UV cured, at 910, with a laser or a projector (e.g., standard SLA or DLP, respectively). To insert conductive features, silver ink is applied, at 920, onto the cured ceramic layer as needed (for example 50 um wide traces, or 5 um thin electrodes of 50 vol % silver particles in organic acrylate resin) and then UV cured, at 925. Another layer of ceramic slurry is then applied and UV cured. The process may be repeated as needed.

When a different ceramic is desired for the dielectric layers of the embedded capacitor, a second aerosol jet print head may be used to deposit this material, for example 50 vol % (ZrSn)TiO4 in organic acrylate resin.

In some embodiments, a tool that provides either a vacuum or an air puff is employed to remove, at 915, liquid, uncured resin from channels, pockets, holes, etc., by either sucking it up (vacuum) or blowing it away (air puff). This then frees up space to deposit another material, such as a resin containing a conductive metal. Instead of aerosol jet deposition, other methods of ink deposition can be used, such as inkjet printing, direct ink writing, micro-extrusion, Continuous Laser Assisted Deposition (CLAD) or Laser Induced Forward Transfer (LIFT).

In some embodiments, a method for printing two different ceramics and a metal is based on Continuous Laser Assisted Deposition (CLAD) or Laser Induced Forward Transfer (LIFT). The feedstock material may be coated onto a transparent sheet (using CLAD or LIFT); the ceramic feedstock may be similar organic or preceramic resin with ceramic particles as above but the viscosity may be higher (as in pastes for example). The metal feedstock can be pure metal films, slurries or pastes. A pulsed laser then jets the feedstock material from the transparent sheet onto the substrate. The feedstock material is then UV cured, or thermal cured, or laser sintered, or thermal sintered, or dried. The part is then removed and pyrolyzed or sintered as described above.

According to an embodiment of the present disclosure, there is provided a device, including: a ceramic body composed of a ceramic material; a first capacitor within the ceramic body; a first conductive trace; and a second conductive trace, the first capacitor including: one or more ceramic dielectric layers; two or more metallic electrodes; a first metallic terminal; and a second metallic terminal, the metallic electrodes alternating with the ceramic dielectric layers, each of the ceramic dielectric layers having a thickness between 1 and 75 microns, each of the metallic electrodes having a thickness between 0.1 and 50 microns, the metallic electrodes begin connected alternately to: the first metallic terminal; and the second metallic terminal, the first metallic terminal being connected to the first conductive trace, the second metallic terminal being connected to the second conductive trace, the first capacitor having a volume of at most 10% of a volume of the ceramic body. As used herein, the terms "ceramic dielectric layer" and "dielectric ceramic layer" are used interchangeably and are synonymous.

In some embodiments, the dielectric ceramic layers have the same thickness as the metallic electrodes.

In some embodiments, the ceramic body is composed of layers having a thickness between 1 micron and 75 microns.

In some embodiments, the ceramic body and the dielectric ceramic layers have the same composition.

In some embodiments, the ceramic body and the dielectric ceramic layers are both composed of between 40 vol % and 75 vol % ceramic particles in a matrix.

In some embodiments, the matrix includes silicon oxycarbide as a major component, the silicon oxycarbide including: between 20 at % and 40 at % Si, between 30 at % and 80 at % C, and between 10 at % and 50 at % O.

In some embodiments, a ceramic particle in the ceramic body includes, as a major component, a substance selected from the group consisting of Al2O3, SiO2, mullite, zirconia, silicate glass, borosilicate glass, aluminosilicate glass, hexagonal boron nitride, cordierite (Mg2Al4Si5O18), aluminum phosphate, magnesium aluminate spinel (MgAl2O4), barium strontium aluminum silicate (Ba,Sr)Al2Si2O8.

In some embodiments, a ceramic particle in a dielectric ceramic layer includes, as a major component, an oxide or a mixture of oxides with a dielectric constant deviating by no more than 30% from a linear temperature dependence over a range of temperatures between 70 Kelvin (K) and 300 K.

In some embodiments, a ceramic particle in a dielectric ceramic layer includes, as a major component, a substance selected from the group consisting of niobates, tantalates, zirconates and titanates, and mixtures thereof.

In some embodiments, a ceramic particle in a dielectric ceramic layer includes, as a major component, a substance selected from the group consisting of MgNb2O6, ZnNb2O6, MgTa2O6, ZnTa2O6, (ZnMg)TiO3, (ZrSn)TiO4, Ba2Ti9O20, BaZrO3, or mixtures thereof.

In some embodiments, a ceramic particle in a dielectric ceramic layer includes, as a major component, an oxide having a dielectric constant greater than 1000 at room temperature.

In some embodiments, a ceramic particle in a dielectric ceramic layer includes, as a major component, a substance selected from the group consisting of BaTiO3, SrTiO3, and mixtures thereof.

In some embodiments, the device further includes a second capacitor within the ceramic body.

In some embodiments, the device further includes a semiconductor chip on the ceramic body.

In some embodiments, the first metallic terminal includes: a first via extending through a first ceramic dielectric layer of the ceramic dielectric layers and through a second ceramic dielectric layer of the ceramic dielectric layers; and a second via extending through a third ceramic dielectric layer of the ceramic dielectric layers and through a fourth ceramic dielectric layer of the ceramic dielectric layers.

In some embodiments, the second via is offset from the first via.

According to an embodiment of the present disclosure, there is provided an article, including: a layered body; a first metallic conductive trace, on the layered body; and a second metallic conductive trace, on the layered body, the layered body including: a plurality of first layers; a plurality of second layers; and a plurality of third layers, wherein: each of the first layers has a thickness of between 1 micron and 75 microns, and includes a first polymer and between 20 vol % and 50 vol % particles of a first ceramic; each of the second layers has a thickness of between 1 micron and 75 microns, and includes a second polymer and between 20 vol % and 50 vol % particles of a second ceramic; each of the third layers has a thickness of between 0.1 microns and 50 microns and includes a first region and a second region; each of the third layers includes, within the first region of the third layer, a third polymer or a solvent and between 40 vol % and 100 vol % metallic particles having a thickness between 0.1 and 50 microns; alternating first regions are connected to a first metallic metallic terminal and a second metallic metallic terminal; the first metallic metallic terminal extends through one or more of the second layers; and the second metallic metallic terminal extends through one or more of the second layers.

In some embodiments, the first polymer is selected from the group consisting of polyacrylates, siloxanes, silazanes, carbosilanes, silsesquioxanes, and mixtures thereof.

In some embodiments, the second polymer is selected from the group consisting of polyacrylates, siloxanes, silazanes, carbosilanes, silsesquioxanes, and mixtures thereof.

According to an embodiment of the present disclosure, there is provided a method, including: printing a green preceramic part; and firing the green preceramic part, to form a ceramic part, the ceramic part including: a ceramic body; and a first ceramic capacitor embedded in the ceramic body, the first ceramic capacitor having a volume of at most 10% of a volume of the ceramic body.

The following describes a reduction to practice of one embodiment. A UV curable preceramic resin was formulated by mixing (mercaptopropyl)methylsiloxane (Gelest) and vinylmethoxysiloxane (Gelest) at a 1:1 molar ratio of thiol/vinyl groups, a UV free radical photoinitiator Irgacure 819 (BASF) at 0.25 wt %, and a free radical scavenger as an inhibitor at 0.2%. This resin was mixed with 15 vol % mullite particles with an average diameter of 1.2 um by ball milling overnight. The liquid pre-ceramic resin was filled in the vat of a Prodways Promaker L5000 DLP printer and UV cured in 50 um layers.

For the electrodes of the embedded capacitor, a UV curable silver resin was formulated by mixing 40 vol % Ag nanoparticles at a 2:1 ratio of 500 nm average diameter and 5 um average diameter into a UV curable organic acrylate-based resin. This resin used ethoxylated trimethylolpropane triacrylate SR499 (Sartomer), and UV free radical photo initiator Irgacure™ 819 (BASF SE.) at 0.05 wt %. To fully combine the Ag particles into the liquid resin, the total volume of particles was added in three additions, with acoustic mixing (LabRAM, Resodyn™ Acoustic Mixers) for 3 minutes at 50 g, in between additions.

Since the Prodways printer used for this reduction to practice is not capable of printing more than one material, the silver resin was applied manually with a spatula across the surface of the previously cured pre-ceramic resin and spread at a height of 30 um tall by adjusting the positioning of the build platform before leveling the layer with the coater blade. After UV exposure of the metal layer, excess uncured silver resin was wiped away. The manual printing process resulted in a non-uniform thickness and a rough surface of the silver layers.

A notional 5-layer capacitor was embedded in the printed sample. One such as-printed sample was cross-sectioned, polished and an optical micrograph was taken. This optical micrograph is shown in FIGS. 10A and 10B, with FIG. 10B being an enlarged view of a portion of FIG. 10A. A similar sample was fired in inert atmosphere at 850° C. for 30 minutes with a heating rate of 1° C./min and a cooling rate of approximately 5° C./min. This sample was then cross-sectioned, polished and an electron micrograph was taken. This electron micrograph is shown in FIGS. 10C and 10D (with FIG. 10D being an enlarged view of a portion of FIG. 10C). A high-resolution electron micrograph of the interface between the metal and the ceramic is shown in FIG. 10E; no reaction products or additional phases are visible.

Separately, 20 vol % MgTiO3 powder with average particle size of 2 um was suspended in acrylate-based UV curable organic resin and printability by UV curing with a DLP printer was demonstrated. MgTiO3 is of interest as a dielectric for embedded class 1 capacitors.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X–Y and the second quantity is at most X+Y. As used herein, when a second number is "within Y %" of a first number, it means that the second number is at least (1–Y/100) times the first number and the second number is at most (1+Y/100) times the first number. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$times 10) and the recited maximum value of 13.5 (i.e., $(1+35/100)$times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a ceramic body with an embedded capacitor have been specifically described and illustrated herein, many modifications and variations will be apparent to those skilled in the art. Accordingly, it is to be understood that a ceramic body with an embedded capacitor constructed according to principles of this disclosure may be embodied other than as specifically described herein. The invention is also defined in the following claims, and equivalents thereof.

What is claimed is:

1. A device, comprising:
 a ceramic body composed of a ceramic material;
 a first capacitor within the ceramic body;
 a first conductive trace; and
 a second conductive trace,
 the first capacitor comprising:
   one or more dielectric ceramic layers;
   two or more metallic electrodes;
   a first metallic terminal; and
   a second metallic terminal,
 the metallic electrodes alternating with the dielectric ceramic layers, each of the dielectric ceramic layers having a thickness between 1 and 75 microns, each of the metallic electrodes having a thickness between 0.1 and 50 microns, the metallic electrodes being connected alternately to:
the first metallic terminal; and
the second metallic terminal, the first metallic terminal being connected to the first conductive trace, the second metallic terminal being connected to the second conductive trace, the first capacitor having a volume of at most 10% of a volume of the ceramic body, the ceramic body being composed of a plurality of dielectric body layers, each of the dielectric body layers being composed of a ceramic material, and the ceramic body having a cavity configured to contain a semiconductor chip.

2. The device of claim 1, wherein the dielectric ceramic layers have the same thickness as the metallic electrodes.

3. The device of claim 1, wherein each of the dielectric body layers has a thickness between 1 micron and 75 microns.

4. The device of claim 1, wherein the ceramic body and the dielectric ceramic layers have the same composition.

5. A device, comprising:
a ceramic body composed of a ceramic material;
a first capacitor within the ceramic body;
a first conductive trace; and
a second conductive trace,
the first capacitor comprising:
one or more dielectric ceramic layers;
two or more metallic electrodes;
a first metallic terminal; and
a second metallic terminal,
the metallic electrodes alternating with the dielectric ceramic layers,
each of the dielectric ceramic layers having a thickness between 1 and 75 microns,
each of the metallic electrodes having a thickness between 0.1 and 50 microns,
the metallic electrodes being connected alternately to:
the first metallic terminal; and
the second metallic terminal,
the first metallic terminal being connected to the first conductive trace,
the second metallic terminal being connected to the second conductive trace,
the first capacitor having a volume of at most 10% of a volume of the ceramic body,
wherein the ceramic body and the dielectric ceramic layers are both composed of between 40 vol % and 75 vol % ceramic particles in a matrix.

6. The device of claim 5, wherein the matrix comprises silicon oxycarbide as a major component, the silicon oxycarbide comprising:
between 20 at % and 40 at % Si,
between 30 at % and 80 at % C, and
between 10 at % and 50 at % O.

7. The device of claim 5, wherein a ceramic particle in the ceramic body comprises, as a major component, a substance selected from the group consisting of Al2O3, SiO2, mullite, zirconia, silicate glass, borosilicate glass, aluminosilicate glass, hexagonal boron nitride, cordierite (Mg2Al4Si5O18), aluminum phosphate, magnesium aluminate spinel (MgAl2O4), barium strontium aluminum silicate (Ba,Sr) Al2Si2O8.

8. The device of claim 5, wherein a ceramic particle in a dielectric ceramic layer comprises, as a major component, an oxide or a mixture of oxides with a dielectric constant deviating by no more than 30% from a linear temperature dependence over a range of temperatures between 70 Kelvin (K) and 300 K.

9. The device of claim 5, wherein a ceramic particle in a dielectric ceramic layer comprises, as a major component, a substance selected from the group consisting of niobates, tantalates, zirconates and titanates, and mixtures thereof.

10. The device of claim 5, wherein a ceramic particle in a dielectric ceramic layer comprises, as a major component, a substance selected from the group consisting of MgNb2O6, ZnNb2O6, MgTa2O6, ZnTa2O6, (ZnMg)TiO3, (ZrSn)TiO4, Ba2Ti9O20, BaZrO3, or mixtures thereof.

11. The device of claim 5, wherein a ceramic particle in a dielectric ceramic layer comprises, as a major component, an oxide having a dielectric constant greater than 1000 at room temperature.

12. The device of claim 5, wherein a ceramic particle in a dielectric ceramic layer comprises, as a major component, a substance selected from the group consisting of BaTiO3, SrTiO3, and mixtures thereof.

13. The device of claim 1, further comprising a second capacitor within the ceramic body.

14. The device of claim 1, further comprising a semiconductor chip on the ceramic body.

15. The device of claim 1, wherein the first metallic terminal comprises:
a first via extending through a first dielectric ceramic layer of the dielectric ceramic layers and through a second dielectric ceramic layer of the dielectric ceramic layers; and
a second via extending through a third dielectric ceramic layer of the dielectric ceramic layers and through a fourth dielectric ceramic layer of the dielectric ceramic layers.

16. The device of claim 15, wherein the second via is offset from the first via.

17. An article, comprising:
a layered body;
a first metallic conductive trace, on the layered body; and
a second metallic conductive trace, on the layered body,
the layered body comprising:
a plurality of first layers;
a plurality of second layers; and
a plurality of third layers,
wherein:
each of the first layers has a thickness of between 1 micron and 75 microns, and comprises a first polymer and between 20 vol % and 50 vol % particles of a first ceramic;
each of the second layers has a thickness of between 1 micron and 75 microns, and comprises a second polymer and between 20 vol % and 50 vol % particles of a second ceramic;
each of the third layers has a thickness of between 0.1 microns and 50 microns and comprises a first region and a second region;
each of the third layers comprises, within the first region of the third layer, a third polymer or a solvent and between 40 vol % and 100 vol % metallic particles having a thickness between 0.1 and 50 microns;
alternating first regions are connected to a first metallic terminal and a second metallic terminal;

the first metallic terminal extends through one or more of the second layers; and the second metallic terminal extends through one or more of the second layers.

18. The article of claim 17, wherein the first polymer is selected from the group consisting of polyacrylates, siloxanes, silazanes, carbosilanes, silsesquioxanes, and mixtures thereof.

19. The article of claim 17, wherein the second polymer is selected from the group consisting of polyacrylates, siloxanes, silazanes, carbosilanes, silsesquioxanes, and mixtures thereof.

20. A method, comprising:

printing a green preceramic part; and firing the green preceramic part, to form the device of claim 1.

* * * * *